M. B. SKINNER.
VALVE STEM RESURFACING TOOL.
APPLICATION FILED APR. 22, 1920.
1,369,138.
Patented Feb. 22, 1921.
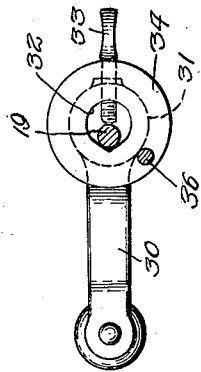
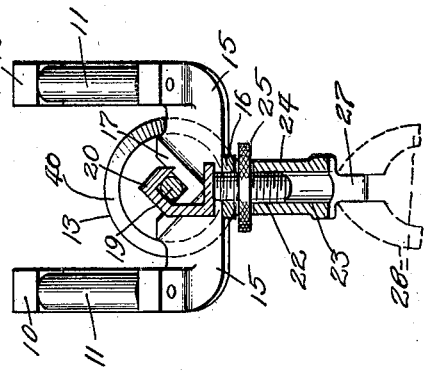
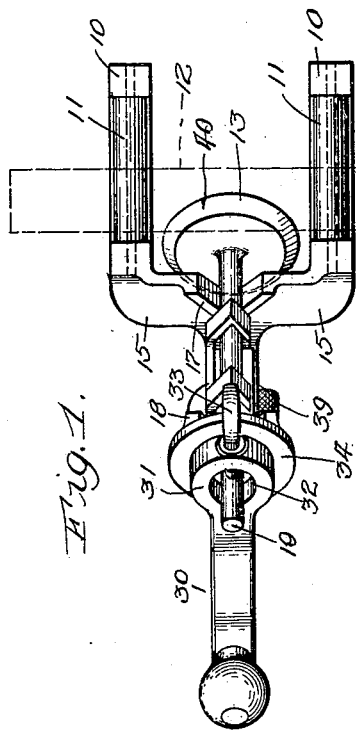
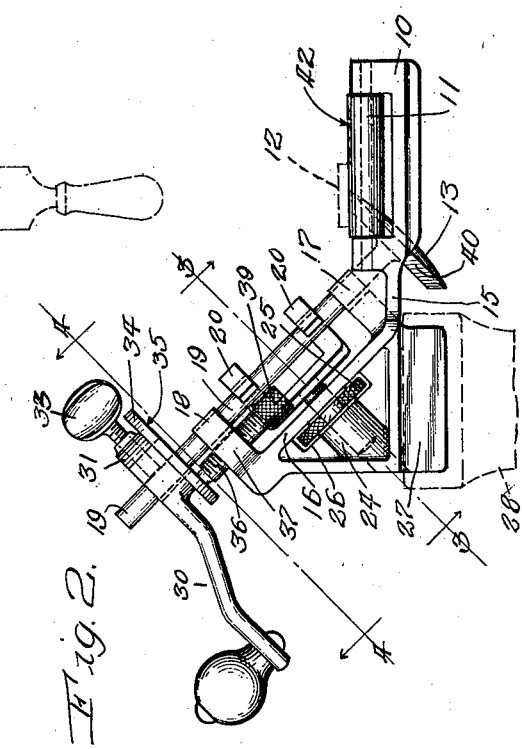
Witness:
R. L. Farrington
Inventor,
Mortimer B. Skinner
By Luther Johns
Atty.

UNITED STATES PATENT OFFICE.

MORTIMER B. SKINNER, OF WILMETTE, ILLINOIS.

VALVE-STEM-RESURFACING TOOL.

1,369,138.   Specification of Letters Patent.   Patented Feb. 22, 1921.

Application filed April 22, 1920. Serial No. 375,722.

*To all whom it may concern:*

Be it known that I, MORTIMER B. SKINNER, a citizen of the United States, and a resident of Wilmette, in the county of Cook and State of Illinois, have invented certain new and useful Improvements in Valve-Stem-Resurfacing Tools, of which the following is a specification.

My invention relates to tools for resurfacing valve stem seats. In the adaptation thereof illustrated herein it has specific application to such valve stems as are used in internal combustion engines at the intake and outlet ports of the cylinders, each valve stem having a shaft and an annular disk at one end with a beveled annular seat or surface thereon adapted to contact the seat of the valve in the cylinder.

The principal objects of these improvements are to provide an easily operable tool for providing a true and accurate surface upon the valve stem seat, a tool made up of few parts and which is strong and durable, and one which almost of necessity will accomplish the desired results even when operated by persons of but limited mechanical skill.

In the accompanying drawings which form a part of this specification, Figure 1 is a top view of the device complete with a valve stem operatively in position and a flat file shown in dotted lines; Fig. 2 shows the same parts in side elevation; and Figs. 3 and 4 are sectional views respectively on the lines 3—3 and 4—4 of Fig. 2 viewed in the directions of the arrows.

The device illustrated includes a pair of spaced-apart prongs or fingers 10 constituting supports for the rollers 11 journaled in the members 10 as indicated by dotted lines in Figs. 1 and 2, the rollers being adapted to rotate on their journals under the influence of the file 12 when it is pushed back and forth. The rollers constitute rest elements for the file and they define a plane, the normally lower general surface of the file which rests upon the rollers being in this plane. The rollers 11 have material length so that the file may rest thereon at various places, according to the diameter of the disk 13 of the valve stem.

Integral with the supports 10 are the frame parts 15 which unite in an angular extension 16, there being provided a valve stem bearing at 17, which is in the form of a V-shaped notch, there being exactly the same kind of a V-shaped notch at 18, and the valve stem shaft 19 rests in these two notches 17 and 18. A pair of coöperating holding elements 20, one of which is well seen in cross section in Fig. 3 constitutes a yoke for holding the shaft 19 in the bearing members 17. These bearing members 17, 18 and 20 are made V-shaped so that they will accurately hold valve stem shafts of different diameters.

The yoke members 20 are carried rigidly by the screw 22 which fits loosely into the hole 23 in the cylindrical shaped boss or enlargement 24 which is an integral part of the frame. A thumb wheel 25 is threaded upon the screw 22, the thumb wheel being in a slot-like opening 26, the rotation of the thumb wheel 25 causing the yoke parts 20 to move relative to the shaft 19. Because these yokes 20 are open at one side the shaft 19 may be readily removed by moving the screw 22 upward.

The frame carries a flange 27 adapted to be held by the vise jaws 28.

The means shown for rotating the shaft 19 comprise a crank arm 30 which has an enlargement or head at 31 and a hole 32 therein which has a substantially V-shaped seat, as well shown in Fig. 4 so as to center the shaft 19 regardless of its diameter, these shafts varying in size. A thumb screw 33 holds the stem 19 firmly. I provide also rigid with the part 31 a plate-like element 34 having a bearing surface at 35 which is at right angles with the axis of the shaft 19, and against this bearing surface 35 bears the end of the screw 36, which is threaded into a lateral extension 37 of the frame. A knurled finger wheel 39 enables the operator to move the crank arm 30, and consequently the valve stem 13 longitudinally in the upward direction thereby causing the valve stem seat at 40 to come up into the plane defined by the upper most lines of the rollers 11, and which plane I have given the reference numeral 42 in Fig. 2.

With the foregoing understanding of the construction a few additional words will make the operation clear. The valve stem having been positioned in the holding parts 17, 18 and 20 and the hand wheel 25 turned so as to cause the shaft 19 to be held snugly yet rotatably, the valve stem is moved upward in its bearing until the seat at 40 comes approximately to the plane 42. Thereupon the crank 30 is applied to the stem 19 with the surface at 35 resting upon the end of the screw 36, and the crank is then tightened upon the shaft 19. The flange 27 may be clamped in the vise jaws either before or after assemblying the valve stem and tool parts as just described. Thereupon the resurfacing operation may be begun. The stem is rotated by turning the crank 30 with one hand and with the other hand the operator moves the file back and forth in a filing operation, always resting it upon the rollers, which limit the depth of the cut. If there be any high places on the valve stem seat 40 these will naturally be removed first, and from time to time, by turning the knurled finger piece 39 the seat 40 will be brought again into the plane 42 or slightly beyond it, and a continuance of the operation soon results in a substantially perfect surface upon the seat 40. For finishing this surface a piece of fine emery paper may be placed between the file and the seat 40 and the operation repeated.

Various changes and modifications from what is specifically shown and described, as indicated by the appended claims, are contemplated by me as being within the scope of the improvements herein set forth.

I claim:

1. In a tool of the class described, the combination of means for holding a flat-surfaced file or the like so as to cut no deeper than a given plane, means for holding rotatably a valve stem having an annular seat to be resurfaced with said annular seat contacting said plane, means for rotating the stem, and means for adjusting the relationship between said annular seat and said plane.

2. In a tool of the class described, the combination of a pair of spaced apart rest elements defining a plane and adapted to support a file or the like, means for holding a valve stem rotatably with a line of the annular valve-contacting surface thereof in said plane, means for rotating the stem, and means for varying adjustably the relationship of said valve-contacting surface and said plane.

3. In a tool of the class described, the combination of a pair of spaced apart rollers constituting rest elements adapted to support a file or the like, said rest elements where they are adapted to support the file or the like defining a plane, means for holding a valve stem rotatably with a line of the annular valve-seat-contacting surface thereof in said plane, means for rotating the stem, and means for moving the stem so as to move said valve-seat-contacting surface adjustably with respect to said plane.

4. In a tool of the class described, the combination of a pair of spaced apart rest elements defining a plane and adapted to support a file, a valve stem support extending angularly from the file supports, means for holding a valve stem shaft rotatably and removably on said valve stem support, a crank arm adapted to be secured readily removably upon the valve stem shaft, the angular relation of said valve stem support to said file supports being such that the annular surface on the valve stem which is adapted to engage the valve seat of the valve may be moved into contact with said plane, and means for varying the relationship between said valve stem surface and said plane.

5. In a tool of the class described, the combination of a pair of spaced apart roller supports, a roller carried by each support, the rollers defining a plane and adapted to support a file, a valve stem support extending angularly with respect to the said plane, said valve stem support having means for holding a valve stem shaft readily removably and rotatably with the annular surface of the valve stem which is adapted to contact the seat of the valve contacting said plane, readily attachable and removable hand-operating means adapted to be secured upon the valve stem shaft for rotating the shaft, said hand-operable means having an annular bearing surface at right angles to the axis of the valve stem, said valve stem support having screw means adapted to bear against said last mentioned annular surface, said screw means being adapted to move the valve stem longitudinally to adjust the relationship of said valve stem surface with respect to said plane.

MORTIMER B. SKINNER.